United States Patent Office 2,862,869
Patented Dec. 2, 1958

2,862,869

PROCESS FOR MANUFACTURING ASPHALT PLASTISOLS

John C. Illman, El Cerrito, Calif., assignor to Shell Development Company, New York, N. Y., a corporation of Delaware No Drawing. Application June 27, 1955
Serial No. 518,393

6 Claims. (Cl. 208—45)

This invention relates to a process for the preparation of asphalt plastisols. More particularly, it is concerned with the preparation of asphalt plastisols having improved stability.

The term "plastisol" is well known in the plastics and coating arts and has reference to a fluid or pasty mixture or suspension of a coating material in particulate form with a plasticizer which is a poor solvent for the resin or polymer at ordinary temperatures, but which is capable of dissolving the particles at elevated temperatures, forming a gel structure. Plastisols have afforded a convenient and economical means of fabricating molded or coated articles from certain restricted classes of thermoplastic resins such as by spread molding, dip coating, spraying or slush molding. For instance, to make a shaped article, a mold of a desired shape is simply charged with plastisol, heated to cause the plastisol to coalesce and then cooled, whereupon the plastisol becomes rigid; the article retains the desired shape after removal from the mold.

For certain purposes, e. g., for charging molds or coating cloth, it is desirable to employ smooth fluid plastisols which flow rapidly in order to increase the speed and convenience of the fabricating operation as well as to improve the quality of the fabricated article. More highly viscous plastisols which may in fact be pastelike in consistency are often formed but are generally undesirable.

Heretofore the type of resinous material found most suitable for use in plastisol processes included especially the polyvinyls, such as polyvinyl chloride. The limitation upon the process has been the tendency of most film-forming materials when in particulate form of suitable subdivision to dissolve gradually in the suspending plasticizers upon storage.

The application of bituminous compositions has always been complicated by the viscosity of the bitumen. Under certain ordinary conditions of temperature it has been possible to overcome this disadvantage by the employment of aqueous asphalt emulsions and the like, controlling the viscosity of the emulsion by a number of well-known means. However, such emulsions cannot be used at freezing temperatures and require the transport of large amounts of water. Cutbacks utilizing relatively volatile thinners are commonly employed. Fire hazards are involved in their use, as well as inefficient utilization of the thinner, which is lost by eventual volatilization. On the other hand, asphalts sometimes may be applied at elevated temperatures for the purpose of decreasing their viscosity. This has the disadvantage of requiring hot storage or hot transporation or the presence of heating and melting equipment at the point of application, all of such requirements being uneconomical if they can be avoided. Significant limitations on the application of heated asphalts for such purposes as impregnation of roofing felts, are the fire hazard which is always present at such times, and skin formation during hot storage. At tropical temperatures handling difficulties arise due to the impossibility of fracturing the highly viscous mass of asphalt from shipping drums for the purpose of charging it into melting pots.

Many of these problems have been solved by the compositions described in copending patent application Serial No. 391,126, filed November 9, 1953, by Illman et al. Therein, asphalt plastisols are described, the hard asphalt particles being suspended in a suitable type of lighter petroleum fractions which, upon heating, coalesce with the asphalt particles to form an asphalt suitable for such purposes as paving or roofing. The problem of preventing the solution of the asphalt particles in the suspending liquid medium was solved to a certain extent by providing the particles with a solvent resistant surface, such as by rinsing with heptane, or by providing the particles with resinous or plastic coatings. While these steps provided asphalt plastisols of satisfactory stability for some purposes, it is recognized that these stabilizing steps disclosed in the copending application necessitate increased operation costs which it would be well to avoid.

It is an object of the present invention to provide improved methods for the preparation of stable asphalt plastisols. It is a specific object of this invention to provide such plastisols which are stable over relatively long storage periods. It is another object of this invention to enable the use of asphalts from a greater diversity of sources than heretofore possible. It is a further object of the invention to enable the preparation of plastisols having lower viscosities for a given asphalt content than heretofore possible. It is an additional object of the invention to provide a less expensive means of preparing asphalt plastisols. Other objects will become apparent from the following description of the invention.

Now, in accordance with the present invention, it has been found that stable asphalt plastisols may be prepared by first mixing a fluid asphaltic residue with a relatively large volume of a lower aliphatic hydrocarbon whereby asphaltenes are precipitated in suitable particle size and the maltenes present in the asphaltic residue dissolve in the aliphatic hydrocarbon. Subsequently, according to the present process, the asphaltenes are separated from the dissolved maltenes and thereafter incorporated with a suitable petroleum fraction suspending fluid to provide asphalt plastisols having improved resistance to undesirable solution during storage.

More particularly, the process of the present invention comprises forming a liquid asphaltic residue, combining 1 volume of said residue with between about 3 and about 50 volumes (preferably 5–30) of an aliphatic hydrocarbon medium predominating (more than about 75% by weight) in substantially straight chain hydrocarbons having from 5 to 12 (preferably 6–9) carbon atoms per molecule, whereby asphaltenes are precipitated and maltenes are dissolved in the medium. The precipitated asphaltenes, after separation from the maltene solution, are then combined with a petroleum fraction having a viscosity between about 100 SUS at 100° F. and about 300 SUS at 210° F. It has been found, in accordance with the present invention, that plastisols so formed have maximum resistance to solution in the suspending petroleum fraction during storage and are prepared by the cheapest known means.

One of the chief advantages gained by the use of the present invention comprises the far greater possibility of selection of suitable stocks for use in the preparation of asphalt plastisols. As contemplated heretofore, asphalt plastisol preparation required the use of an asphalt having a sufficiently brittle character so that fine particles could be prepared by grinding or other known means. Consequently, the more widely available softer grades of asphalts could not be used. By the use of the present invention, however, it is possible to employ asphalts of any degree of hardness and from any source. Economically, of course, it is preferable to employ an asphalt having at least about 5% by weight of asphaltenes and preferably more than about 20% by weight of asphaltenes so as to have a minimum of disposable maltene fractions dissolved in the aliphatic hydrocarbon medium. Hence, it will be understood that not only hard asphalts, i. e. having penetrations from 0 to 10 (ASTM D5–25, 77° F., 100 gram load, 5 seconds), but also other relatively softer asphaltic residues, preferably having a maximum of 200 penetration, and such material as residual industrial fuel oils having viscosities as low as about 45 S. S. F., at 122° F., for example, 45–300 S. S. F., as measured by the same test. In addition to such penetration characteristics, the asphalts will generally have softening points between about 90° F. and about 350° F. They include straight run asphalts, steam distilled asphalts, blown asphalts, solvent refined asphalts, cracked asphalts, vacuum flashed asphalts and similar asphaltic residues, all of which preferably comprise at least about 5% by weight of asphaltenes. The term "asphaltenes" is defined in Abraham, fifth edition, of "Asphalts and Allied Substances" on pages 1165–6, as being the non-mineral constituents remaining insoluble in petroleum naphtha, thus differentiating them from the maltenes (petrolenes) which dissolve in the same medium and under the same conditions. As the test is run at room temperature (65–75° F.), this latter would constitute a further limitation on the definition. A still further limitation will comprise the proportion of petroleum naphtha employed for the purpose of causing the separation. According to the standardized method, 50 volumes of petroleum naphtha are employed, the test temperature normally being ambient (room) temperature. While this standard procedure defines the term, it will be understood that the asphaltic fraction insoluble at room temperature in any aliphatic hydrocarbon having 5–12 carbon atoms may be regarded as "asphaltene" for the present invention.

The copending application Serial No. 391,126 describes suitable methods of the preparation of relatively hard types of asphalts by steam distillation, propane precipitation or oxidation such as by air blowing. While all of these methods are useful for the preparation of asphalts to be employed in the present process, any other means for the preparation of asphaltic residues may be employed, as long as the product produced contains an economically feasible (more than 5% by weight) proportion of asphaltenes and preferably has a penetration less than about 200 at 77° F.

The asphalts may be introduced into the aliphatic hydrocarbon precipitant by several alternative means, dependent upon their physical characteristics. For example, hard asphalts (especially cracked or blown), i. e. those having a penetration at 77° F. less than about 10, are preferably introduced by first dissolving them in a minimum amount of an aromatic hydrocarbon solvent. In order to minimize the effect of the solvent upon the precipitation of the asphaltenes, it is preferred that the proportion of solvent be restricted to between about 0.5 and 2 volumes for each volume of the asphaltic residue.

The aromatic solvent is preferably one predominating in aromatic hydrocarbons having less than 10 carbon atoms per molecule of which benezene and toluene are suitable members. Preferably, the aromatic solvent contains at least about 70% by weight of such aromatic hydrocarbons and more desirably contains 85% or more of such hydrocarbons. The solution may take place at room temperature or, preferably, at reflux temperature in order to hasten the process. Softer asphalts, i. e. those having penetrations greater than about 10 at 77° F., may be dispersed sufficiently for the present purpose by refluxing in the presence of a limited proportion of the precipitating aliphatic hydrocarbon, although the aromatic solvent may be used in addition to or in place of the aliphatic medium. The proportion again is preferably limited to between about 0.5 and 2 volumes of the refluxing medium for each volume of the asphalt, regardless of whether or not the refluxing medium comprises entirely aliphatic hydrocarbons having between 5 and 12 carbon atoms per molecule or additionally contains aromatic hydrocarbons as well.

Of course, the asphalt may be introduced into the aliphatic hydrocarbon medium for the purpose of precipitation asphaltenes in the form of a heated fluid asphaltic residue unmodified by the presence of limited proportions of aromatic or aliphatic hydrocarbons.

The precipitation step is believed to be important, since if carried out counter to the following disclosed procedure, the particles of asphaltenes so derived are undesirably small and tend to dissolve at a much more rapid rate than if prepared according to the described and claimed process.

In order to obtain the desirable range of asphaltene particle size, it is necessary to add the fluid asphaltic residue to a substantially larger body of aliphatic hydrocarbon medium.

By aliphatic hydrocarbon medium, in this particular instance, is meant one or more aliphatic hydrocarbons having from 5 to 12 carbon atoms per molecule and preferably predominantly straight chain varieties of these materials. The medium should contain no more than about 25% by volume of non-aliphatic materials and preferably less than about 10% by volume. Individual aliphatic hydrocarbons such as hexane, heptane, octane, nonane, decane and dodecane may be employed, the straight chain (normal) isomers of these being preferred. However, mixtures of these materials may be employed which are prepared either synthetically or may occur as distilation fractions or components of naturally occurring mixtures such as certain crudes. Thus, de-pentanized natural gasoline or similar fractions may be employed having a minimum of about 6 carbon atoms per molecule and a maximum boiling point below about 300° F. By "a substantially larger volume" is meant addition of 1 volume of the asphaltic residue to 3–50 volumes and preferably between 5 and 30 volumes of the aliphatic hydrocarbon medium.

It is necessary for the residue to be added to at least 3 volumes of the aliphatic hydrocarbon medium in order to obtain the proper particle size distribution, since if the reverse process is employed, i. e. gradual dilution of the fluidized asphaltic residue with aliphatic hydrocarbons, then the asphaltenes so precipitated have been found to be of such small particle size that they form a more viscous dispersion and dissolve in the suspending oil later employed at much too rapid a rate to be satisfactory. If, however, the correct procedure is utilized, the resulting precipitated asphaltene particels have diameters within the range of about 1 micron to about 200 microns and predominate in a particle size range of between about 10 and about 50 microns in average diameter. It will be understood that the coarser the particle size, consistent with tendency of larger particles to settle on storage, the slower the rate of solution of the particles in the suspending plastisol oil.

The fluid or liquefied (dissolved) asphaltic residue may be added to the aliphatic hydrocarbon medium at any temperature between the freezing point of the medium and the boiling point thereof. Preferably, of course, the liquid asphaltic residue is mixed with the aliphatic hydrocarbon medium at about room temperature or within a temperature range from about 10° F. to about 110° F. Under these circumstances the rate of solution of the maltene fraction in the aliphatic hydrocarbon medium is reasonably rapid and the asphaltenes consequently precipitate in their proper particle size distribution range. The introduction of the liquid asphaltic residue into the aliphatic hydrocarbon medium is preferably conducted in the presence of agitation. While this may comprise mechanical shaking, stirring or tumbling of the mixture, the agitation may be provided by refluxing of the medium if this condition is part of the precipitation process. It was noted that asphaltene particles prepared from straight run asphalts grew or agglomerated to a desirable extent when left in the precipitating medium for a period of 1–48 hours at ambient temperature.

Following the precipitation of the asphaltenes and solution of the maltenes in the aliphatic hydrocarbon medium, the solution and the precipitated particles are separated by any suitable means, including filtration, centrifuging, sedimentation, decanting or similar treatments. Preferably the separation is such that a minimum amount of drying of the asphaltene particles is required (if any at all) and still more preferably, the separation technique employed is one wherein a minimum contamination of the particles with maltene solution occurs.

The separated asphaltene particles, in accordance with the subsequent step in the process of the invention, are incorporated in the plastisol suspending medium.

In selecting a fluid medium for suspension of the particulate hard asphalt in accordance with this invention, it is the intention to utilize a material which, when coalesced with the asphalt, will produce a substantially homogeneous bituminous composition exhibiting the properties desired in a normal asphalt paving or roofing composition. Thus, the suspending oil should be of such composition that it not only does not exhibit an undue rate of solution of the asphalt particles, but when subsequently coalesced with the latter, it will be substantially compatible therewith without any substantial removal or addition thereto in the form of supplementary fluxing ingredients. For example, the plastisols contemplated herein do not make use of relatively volatile flux oils (such as kerosene or fuel oil) wherein a substantial proportion of the oil is eventually volatilized from the composition. Nor is use to be made exclusively of oily aliphatic hydrocarbon oils, since such oils, in spite of being satisfactory with respect to plastisol stability, exhibit poor compatibility with the asphalt after attempting coalescence. Furthermore, the exclusive use of highly aromatic oils such as lubricating oil extracts is not contemplated, since the latter, while forming compatible compositions, tend to cause rapid dissolution of the asphalt particles during storage even in the absence of heating.

Taking each of these facts into consideration, therefore, the present invention contemplates the use of a hydrocarbon oil of lubricating oil viscosity containing between about 15% and about 60% of aromatic type hydrocarbons as the principal suspending oil. For application under extremely cold, e. g. arctic, conditions, the addition of minor quantities of lighter oils, preferably of aliphatic character may be utilized, but the major proportion of spending oil should be that defined above. Thus, organosol type of compositions are contemplated wherein compatible or non-compatible relatively volatile diluents are used in addition to the oil of lubricating viscosity.

Suitable lubricating oil or pale oil fractions which may be employed include bulk distillates having a viscosity of from about 100 SUS at 100° F. to about 300 SUS at 210° F. and may contain aromatics in the order of 30–60% and flash points about 300° F., particularly where paving grade asphalt compositions are contemplated. Preferably these fractions are essentially non-waxy. Where blown type asphalt compositions are desired, the aromatic hydrocarbon content should be still lower, in the order of 15–30% aromatics. Reference to aromatics is given in terms of infra red analyses. Suitable lubricating oil fractions comprise bulk lubricating oil distillates or fractions thereof, and lubricating oil raffinates obtained from the extraction of lubricating oil fractions with selective solvents for aromatics such as sulfur dioxide, phenol, sulfolane, nitrobenzene, furfural, and the like. These raffinates are well known in the art of petroleum refining. Combinations of extracts and raffinates also are suitable. The hydrocarbon lubricating oil may be replaced entirely or in part with synthetic lubricants of similar viscosity, volatility and solvency characteristics, e. g. tetraalkyl silicates, silicones, aliphatic diesters, etc.

In addition to the types of hydrocarbon oils specified as suspending media for the asphaltene particles, other materials may be employed together with or in place of these substances. For example, it is possible to employ all or a part of the maltenes separated from the asphaltenes in the previous asphaltene precipitation step. These may be combined with a lubricating oil falling within the limitations given hereinbefore for the suspending oils, preferably in amounts of at least about 10% by weight of the suspending oil. Under these circumstances, the reconstituted asphalt which is prepared by coalescence of the particles with the suspending oil, has all of the proper combination of properties desired in an asphalt. For many purposes, however, the incorporation of maltenes is unnecessary. Moreover, it is possible to employ maltenes from an entirely different source than that from which the asphaltene particles are derived. Thus, it will be seen that a selection is possible, a desirable type of asphaltene being obtained from one source while a desirable type of maltene is obtained from an entirely different source. By proper incorporation of selected asphaltenes and maltenes it is possible to prepare asphalts having desired properties relative to penetration index, penetration, softening point, ductility, etc.

In accordance with a further feature of the present invention, it has been found that the asphaltenes are especially sensitive to the action of ultra violet light and/or oxygen or other oxidizing influence. This sensitivity is apparent even at ordinary room temperature, although temperatures both above and below room temperature may be employed. The phenomenon is especially notable in that it makes the asphaltene particles even more resistant to solution in the suspending oils than when they are in their original precipitated condition. It is merely necessary to precipitate the asphaltene particles as described hereinbefore and then expose them in relatively shallow layers, i. e. less than one inch, to the action of ultra violet light, oxygen, $SO_2$, chlorine or other oxidizing medium, for a period varying from about 15 minutes to about 1 week (preferably 1–98 hours), at temperatures from about 50° F. to about 150° F. Preferably the exposed material is periodically stirred or agitated to expose all particles to the modifying influence. Subsequent to this exposure period, the particles are then suspended in the above-described suspending oils for the preparation of plastisols having still further increased stability against solution of the particles in the suspending oil.

It is not apparent at the present time what takes place during this exposure to ultra violet light or oxidizing influences. The change would appear to be superficial, that it, restricted to the surface of the particles, since the asphalts reconstituted upon solution of the particles in a suspending oil are substantially identical to asphalts reconstituted from unexposed particles in the same oils.

The subject plastisols, prepared as described above by addition of the precipitated asphaltene particles to the suspending oil with sufficient agitation to cause the formation of a relatively stable suspension may be applied to the desired site by a number of well-known means such as spraying (as in the case of paving applications), or by application of a uniform amount by use of doctor blade technique, as in application to roofing felts, fabrics and the like. When utilized for paving purposes, the plastisol may be sprayed on the hot or cold aggregate either in situ or in a mixing apparatus such as a cement mixer. Alternatively, the plastiol may be heated in order to coalesce the ingredients prior to application to aggregate or other solid base susbstance. Subsequent to the application of the plastisol, sufficient heat should be applied to the composition to accelerate coalescence of the asphalt particles with the suspending oil to form essentially a homogeneous asphalt composition having the normal properties of asphalts employed for paving, saturation or coating purposes. The heat may be supplied by utilizing preheated aggregate. The degree of heating required will vary quite widely dependent upon the compatibility of the asphalt particles with the oil and upon the quantity of asphalt plastisol to be coalesced. Normally a relatively low degree of heating is required (e. g., at least 30 seconds at at least 200° F) and it is one of the objects of this invention to so design the plastisol that a minimum degree of heating is necessary to cause coalescence. At the same time the latter is prevented during reasonably long storage periods at ambient temperatures. For example, it is desirable to pass a roofing felt impregnated with the asphalt plastisol through an oven or a tunnel having infra red lamps of sufficient intensity to cause the desired coalescence. Where larger structures such as pavements and the like are to be treated, open flame type of heaters may be utilized although they are not always essential.

EXAMPLE I

The asphalt utilized in the preparation of the samples described in Table I was derived by vacuum flashing a long residue obtained from the refining of a California crude. The vacuum flashed asphalt had a softening point of 222° F. Table I describes a variety of conditions employed in the preparation of plastisols according to the process of the present invention. It will be seen, according to the data, that the asphaltic pitch was dissolved in various quantities of benzene so as to provide a fluid or liquified product. This fluid product was then introduced with rapid stirring into heptane at room temperature, the ratio of heptane to pitch being varied as shown in the table. By this means, as the data show, varying amounts of asphaltenes were precipitated in suitable particle size for the preparation of plastisols. These asphaltenes were washed lightly with heptane or pentane, drained on a filter plate, and air dried. A bulk distillate lubricating oil from a mixture of Mt. Poso and Coalinga California crudes, having a viscosity of 60 SUS at 210° F. was employed as the suspending medium for the plastisols. It will be seen, according to the data, that between 35 and 40% of asphaltenes, based on the total plastisol, was mixed with the bulk distillate to prepare the subject plastisols. These had originally low viscosities which at the end of one week at 100° F. had increased only to a limited extent.

The bulk distillate and asphaltenes were coalesced to form a substantially homogeneous asphaltic composition by warming to a temperature of about 300° F. The properties of the asphalts so prepared are given in Table I.

*Table I*

| Sample | Benzene: Pitch Wt. Ratio | Heptane: Pitch Ratio | Asphaltenes | | Plastisol | | | Asphalt | | |
|---|---|---|---|---|---|---|---|---|---|---|
| | | | Percent w. | Size, μ | Percent Asphaltene | Viscosity at 100° F., poises | | Pen. | S. P. | P. I. |
| | | | | | | Orig. | 1 Week | | | |
| A | 0.2:1 | 7.3:1 | 48 | 1–100 | 40 | 31 | -------- | 188 | 105 | −0.1 |
| B | 0.5:1 | 10:1 | 40 | 1 100 | 35 | 15 | 282 | 165 | 111 | +0.7 |
| C | 1.5:1 | 40:1 | 30 | 1–100 | 35 | 10 | 74 | 81 | 130 | +1.2 |

EXAMPLE II

The same series of steps was carried out but on an asphalt derived from a Los Angeles Basin California crude by mildly thermally cracking a reduced crude therefrom and removing the distillate material under vacuum. The asphalt had a softening point of 233° F. and represented 19.4% of the long residue (reduced crude). Table II shows the results obtained by the preparation of plastisols according to the process of the present invention.

*Table II*

| Sample | Benzene: Pitch Wt. Ratio | Heptane: Pitch Ratio | Asphaltenes | | Plastisol | | | Asphalt | | |
|---|---|---|---|---|---|---|---|---|---|---|
| | | | Percent w. | Size, μ | Percent Asphaltene | Viscosity at 100° F., poises | | Pen. | S. P. | P. I. |
| | | | | | | Orig. | 1 Week | | | |
| D | 1:1 | 10:1 | 53 | 2–200 | 35 | 21 | 820 | 110 | 121 | +0.9 |
| E | 1:1 | 40:1 | 56 | -------- | 35 | 10 | 23 | 80 | 135 | +1.8 |
| F | 1.5:1 | 40:1 | 48 | -------- | 35 | 23 | -------- | 71 | 137 | +1.7 |

EXAMPLE III

The data contained in Table III indicate the results obtained by the preparation of plastisols from a variety of asphalts as indicated in the left-hand column. It will be seen that highly stable plastisol compositions could be formed from any one of these and that by choosing the original asphalt for a particular purpose, the properties of the final product could be closely controlled.

Table III

| Asphalt | Benzene: Pitch Wt. Ratio | Heptane: Pitch Ratio | Asphaltenes | | Plastisol | | | Asphalt | | |
|---|---|---|---|---|---|---|---|---|---|---|
| | | | Percent w. | Size, μ | Percent Asphaltene | Viscosity at 100° F., poises | | Pen. | S. P. | P. I. |
| | | | | | | Orig. | 1 Week | | | |
| Cracked Venezuelan asphalt | 1.5:1 | 40:1 | 52 | -------- | 35 | 12 | 16 | 54 | 183 | +5.1 |
| Straight Run Venezuelan, 180/200 Pen | 1:1 | 40:1 | 14 | 1–400 | 35 | 13 | -------- | 275 | 102 | -------- |
| Calif. Coastal, 200 Pen | 1:1 | 40:1 | 21 | 1–200 | 35 | 17 | 1,500 | 225 | 107 | +1.3 |
| Los Angeles Basin, Butane, Asphalt | 0.75:1 | 40:1 | 38 | 1–150 | 35 | 12 | 170 | 240 | 98 | −0.7 |
| Calif. Coastal Asphalt | -------- | 40:1 | 23 | 1–100 | 35 | 12 | 147 | 225 | 103 | +0.4 |

EXAMPLE IV

In each of Examples I–III, heptane was employed as the precipitating medium for the asphaltenes. Table IV shows that other media are suitable for the precipitation of asphaltenes which are useful in the preparation of plastisols according to the process of the present invention. The precipitant employed in this example comprised "secondary-column tops," consisting of gasolines including hexanes and other hydrocarbons having a maximum boiling point of about 300° F. A variety of asphalts was treated, the vacuum flashed asphalt being the same as that utilized in Example I; the cracked asphalt being that utilized in Example II, while the California Coastal 200 pen, asphalt was the same as that employed in the procedure described in Example III. It will be noted that the use of the secondary-column tops produced a smaller proportion of asphaltenes than when heptane was employed and that the asphalts derived by coalescence of the plastisols all had higher penetration indices (P. I.) than when heptane was the precipitant.

Table IV

| Sample | Benzene: Pitch Wt Ratio | Tops: Pitch Ratio | Asphaltenes | | Plastisol | | | Asphalt | | |
|---|---|---|---|---|---|---|---|---|---|---|
| | | | Per- cent w. | Size μ | Percent Asphaltene | Viscosity at 100° F., poises | | Pen. | S. P. | P. I. |
| | | | | | | Orig. | 1 Week | | | |
| Vacuum Flashed | 1.5:1 | 40:1 | 22.5 | 5–50 | 35 | 10 | 1,700 | 95 | 131 | +1.9 |
| Cracked | 1:1 | 40:1 | 45 | 5–80 | 35 | 12 | 30 | 62 | 157 | +3.4 |
| Calif. Coastal 200 Pen | 1.5:1 | 40:1 | 9 | 5–50 | 35 | 11 | -------- | 93 | 137 | +2.6 |

EXAMPLE V

The comparative data in Table V illustrate the advantages gained by exposing the precipitated asphaltenes to the action of ultra violet light, namely difused sunlight at room temperature. The original asphalt employed for the preparation of the asphaltenes was derived by topping California Coastal crude. The precipitant employed was the secondary-column tops described in Example IV. Asphaltenes so precipitated were substantially immediately incorporated with 60 SUS at 210° F. bulk distillate utilized in the previous Examples to form a plastisol having an original low viscosity which increased to 1500 poises at the end of one week. Part of the precipitated asphaltenes were exposed for about 3 days at room temperature to weak sunlight in a layer about one-quarter of an inch thick. Upon incorporation with the same bulk distillate and storage at 100° F. it will be seen, according to Table V, that the increase in viscosity was only about 5% as great as in the case of the unexposed asphaltene plastisol. Consequently, it is evident that such treatment promotes the preparation of plastisols having maximum stability with respect to viscosity increase. The properties of the asphalts derived from these two plastisols were quite similar and do not indicate that any drastic change in the main body of the asphaltenes occurred during this exposure period.

Table V

| Sample | Benzene: Pitch Wt Ratio | Tops: Pitch Ratio | Asphaltenes | | Plastisol | | | Asphalt | | |
|---|---|---|---|---|---|---|---|---|---|---|
| | | | Per- cent w. | Size μ | Percent Asphaltene | Viscosity at 100° F., poises | | Pen. | S. P. | P. I. |
| | | | | | | Orig. | 1 Week | | | |
| No asphaltene aging | -------- | 40:1 | 11.5 | 1–150 | 35 | 12 | 1,500 | 115 | 127 | +1.9 |
| Asphaltene Aged | -------- | 40:1 | 11.5 | 1–150 | 35 | 14 | 83 | 60 | 147 | +2.3 |

I claim as my invention:

1. In the process for the preparation of an asphalt plastisol, the steps comprising forming a fluid body of an asphalt, said asphalt comprising more than 5% by weight of asphaltenes by dissolving one volume of the residue in 0.5–2 volumes of an aromatic solvent, said solvent predominating in aromatic hydrocarbons having less than 10 carbon atoms per molecule, introducing one volume of the asphalt into 3–50 volumes of an aliphatic hydrocarbon medium, said medium comprising predominantly straight chain paraffin hydrocarbons having from six to twelve carbon atoms per molecule and less than 25% by weight of aromatic hydrocarbons, whereby asphaltene particles having a size distribution between about 1 micron and about 200 microns precipitate and maltenes dissolve in the aliphatic hydrocarbon medium separating the precipitated asphaltenes from dissolved maltenes, and suspending the asphaltenes in a petroleum fraction having a viscosity between about 100 SUS at 100° F. and about 300 SUS at 210° F. and an aromatic content between about 15% and about 60%, whereby a stable plastisol composition containing less than about 40% by weight of asphaltenes is formed.

2. In the process for the preparation of an asphalt plastisol, the steps comprising forming a fluid body of a cracked asphalt, said asphalt comprising more than 20% by weight of asphaltenes by dissolving one volume of the residue in 0.5–2 volumes of an aromatic solvent, said solvent predominating in aromatic hydrocarbons having less than 10 carbon atoms per molecule, introducing one volume of the asphalt into 5–30 volumes of an aliphatic hydrocarbon medium, said medium comprising predominantly straight chain paraffin hydrocarbons having from six to twelve carbon atoms per molecule and less than 25% by weight of aromatic hydrocarbons, whereby asphaltene particles having a size distribution between about 1 micron and about 200 microns precipitate and maltenes dissolve in the aliphatic hydrocarbon medium, separating the precipitated asphaltenes from dissolved maltenes, and suspending the asphaltenes in a petroleum fraction having a viscosity between about 100 SUS at 100° F. and about 300 SUS at 210° F., and an aromatic hydrocarbon content between about 15% and about 60%, whereby a stable plastisol composition containing less than about 40% by weight of asphaltenes is formed.

3. In the process for the preparation of an asphalt plastisol, the steps comprising forming a fluid body of an asphaltic residue comprising more than 5% by weight of asphaltenes and having a penetration less than about 10 at 77° F. by dissolving one volume of the residue in 0.5–2 volumes of an aromatic solvent, said solvent predominating in aromatic hydrocarbons having less than 10 carbon atoms per molecule, introducing one volume of the asphalt into 5–30 volumes of an aliphatic hydrocarbon medium, said medium comprising predominantly straight chain paraffin hydrocarbons having from six to twelve carbon atoms per molecule and less than 25% by weight of aromatic hydrocarbons, whereby asphaltene particles having a size distribution between about 1 micron and about 200 microns precipitate and maltenes dissolve in the aliphatic hydrocarbon medium, separating the precipitated asphaltenes from dissolved maltenes, and suspending the asphaltenes in a petroleum fraction having a viscosity between about 100 SUS at 100° F. and about 300 SUS at 210° F. and an aromatic content between about 15% and about 60%, whereby a stable plastisol composition containing less than about 40% by weight of asphaltenes is formed.

4. A process according to claim 1 wherein the asphaltic residue is the residue obtained from a vacuum flashing operation.

5. A process according to claim 1 wherein the asphaltic residue is a propane asphalt.

6. A process according to claim 1 wherein the aliphatic hydrocarbon medium comprises predominantly heptane.

References Cited in the file of this patent

UNITED STATES PATENTS

| | | |
|---|---|---|
| 1,868,211 | Le Nobel | July 19, 1932 |
| 2,200,484 | Batchelder | May 14, 1940 |
| 2,201,396 | Fryar | May 21, 1940 |
| 2,366,657 | Sorem | Jan. 2, 1945 |

OTHER REFERENCES

Abraham: "Asphalts and Allied Substances," fifth edition, vol. 2, pages 1229, 1463 and 1464. Pub. by D. Van Nostrand Co., New York, N. Y. (1945).